United States Patent [19]

Lynch et al.

[11] 4,224,678
[45] Sep. 23, 1980

[54] METHOD AND APPARATUS FOR IMPLEMENTING A PROCESSOR BASED ON THE RATIONALIZED HAAR TRANSFORM FOR THE PURPOSE OF REAL TIME COMPRESSION OF VIDEO DATA

[75] Inventors: Robert T. Lynch; James J. Reis, both of Torrance, Calif.

[73] Assignee: Northrop Corporation, Los Angeles, Calif.

[21] Appl. No.: 673,799

[22] Filed: Apr. 5, 1976

Related U.S. Application Data

[63] Continuation-in-part of Ser. No. 559,246, Mar. 17, 1975, abandoned.

[51] Int. Cl.² .............................................. H04N 7/12
[52] U.S. Cl. ..................................... 364/724; 358/133
[58] Field of Search ........................... 235/152, 156; 178/DIG. 3; 179/15 AV, 15 BW, 15.55 R; 364/724; 358/133

[56] References Cited

U.S. PATENT DOCUMENTS

| 3,605,019 | 9/1971 | Cutter | 179/15.55 R |
| 3,750,024 | 7/1973 | Dunn et al. | 179/15.55 R |
| 3,980,809 | 9/1976 | Cook | 178/DIG. 3 X |
| 3,984,626 | 10/1976 | Mounts et al. | 178/Dig. 3 X |

OTHER PUBLICATIONS

H. C. Andrews et al., "A Generalized Technique For Spectral Analysis", *IEEE Transactions on Computers*, C-11, 1 Jan. 1970, pp. 16–25.
*Applications of Walsh Functions & Sequency Theory*, The Institute of Electrical & Electronic Engineers, Inc., 1974, pp. 127–139.

*Primary Examiner*—David H. Malzahn
*Attorney, Agent, or Firm*—Edward A. Sokolski

[57] ABSTRACT

A method and apparatus is described for implementing a real time video processing system based on the rationalized Haar transform. The system operates in real time to remove redundant information from video data for the purpose of compressing the video bandwidth. A digital apparatus for implementing the system is described which is capable of processing video in real time at data rates up to 60 M bits per second.

11 Claims, 14 Drawing Figures

METHOD AND APPARATUS FOR IMPLEMENTING A PROCESSOR BASED ON THE RATIONALIZED HAAR TRANSFORM FOR THE PURPOSE OF REAL TIME COMPRESSION OF VIDEO DATA

This application is a continuation in part of our application Ser. No. 559,246, filed Mar. 17, 1975, now abandoned.

BACKGROUND OF THE INVENTION

The trend today in communications is to digital. The reasons for this trend are several. Digital encoding is more tolerant of the effects of channel noise, digital signals are easily regenerated, digital system errors are simply predicted and controlled, digital systems are highly reliable, and digital systems in general tend to be more economical than analog systems.

Despite the many important advantages associated with digital processing, there is one serious drawback; namely, data bandwidth expansion associated with conversion from continuous analog data to sampled digital data. Data bandwidth expansion means that a larger bandwidth channel must be provided to accommodate the digital data, which significantly increases the channel cost. There has been much interest in recent years in developing methods to reduce the data bandwidth and thus eliminate the expense of large bandwidth communications channels.

Of the methods which have been investigated, those based on linear transforms, such as Fourier, Walsh-Hadamard, Slant, Cosine, and Haar appear to be the most efficient in terms of offering the most compression with the least signal degradation. Transform techniques have only recently been applied to the problem of compressing the bandwidths of picture data. Hardware has been built in Japan, England, and the United States to compress in real time video picture data. However, at this writing, these equipments have been expensive to build and are relatively large in size.

The present invention is a method and apparatus for implementing a real time video bandwidth compression system based on the rationalized Haar transform. The present invention overcomes the cost and size disadvantages of existing systems. The Haar transform was selected over competing transforms (Fourier, Walsh-Hadamard, Slant, etc.) for the following reasons:

1. Only addition and subtraction operations are required (no multiplication operations).
2. The transformation is sparse and has a fast computational algorithm requiring only 2 (N-1) operation for computing an N point transform.
3. The inverse transform has the same form as the direct transform.
4. The transform puts both the low frequency background information and the high frequency edge information in a picture in a form which allows for efficient compression encoding (filtering).
5. The transform can be efficiently mechanized (low cost, small size) in digital form (LSI, hybrid, etc).

SUMMARY OF THE INVENTION

The method is based on transforming vectors of sampled video data (either 1-D or 2-D) by a modified form of the well-known Haar transformation known as the rationalized Haar transform. The modification involves the removal of irrational numbers appearing in the Haar transform for the purpose of making the transform simpler to compute. The computation of the rationalized Haar transform requires only addition and subtraction operations on the video data. For an N point data vector, 2(N-1) operations are required to compute a transform. The function of the data transformation is to compact most of the energy in each original video data vector into only a relatively few transform coefficients. The transformed data is then filtered in various ways, the function of each filter being to encode the filtered data with the minimum number of bits subject to some picture fidelity criterion, such as 1. Minimizing the error between the original and reconstructed pictures.
2. Maximizing the energy in the reconstructed picture.
3. Subjective quality of reconstructed picture.

The transform filters can be any combination of the following: zonal, threshold, divide by a power of 2, multiply by a power of 2, integer log base 2 compand, and adaptive N largest coefficients.

Reconstruction of the transform filtered picture is accomplished by inverse filtering and inverse rationalized Haar transforming the compressed video data. The inverse transform has the same structure as the direct transform, with the additional requirement of dividing the compressed data by powers-of-two.

The preferred form of mechanization of the system apparatus is digital. The apparatus for computing the Haar transform is constructed by cascading stages composed of latches and adder/subtractor modules. The apparatus for implementing the transform filters contains the following logic components:

| Zonal filter: | Read only memory |
|---|---|
| Block quantizer: | Read only memory |
| Threshold filter: | Comparator |
| Amplitude compander: | Read only memory |
| N largest filter: | Comparator and latches |

The rationalized Haar transform H is defined for dimension $N=2^M$, where $M=1, 2, 3$ (i.e., any positive integer) . . . as follows $$H = H_M H_{M-1} \ldots H_1,$$

where $$H_1 = \begin{vmatrix} 1 & 1 & & & & & \\ & & 1 & 1 & & & \\ & & & & \cdot & & \\ & & & & & \cdot & \\ & & & & & & 1 & 1 \\ 1 & -1 & & & O & & \\ & & 1 & -1 & & & \\ & & & & \cdot & & \\ & O & & & & \cdot & \\ & & & & & & 1 & -1 \end{vmatrix} \begin{matrix} \\ \\ \\ N/2 \\ \\ \\ \\ \\ \\ N \times N \end{matrix}$$

$$H_{M-1} = \begin{vmatrix} \begin{matrix} 1 & 1 & 0 & 0 \\ 0 & 0 & 1 & 1 \\ 1 & -1 & 0 & 0 \\ 0 & 0 & 1 & -1 \end{matrix} & & & \\ & 1 & & O \\ & & 1 & \\ & & & \ddots \\ O & & & & 1 \end{vmatrix}_{N \times N}$$

and $$H_M = \begin{vmatrix} \begin{matrix} 1 & 1 \\ 1 & -1 \end{matrix} & & & \\ & 1 & & O \\ & & 1 & \\ & & & \ddots \\ O & & & & 1 \end{vmatrix}_{N \times N}$$

where "O" indicates that the remaining elements of the matrix are "0".

The inverse rationalized Haar transform $H^{-1}$ is defined as follows:

$$H^{-1} = H^T P = H_1^T H_2^T \ldots H_M^T P.$$

where $$H_1^T = \begin{vmatrix} \begin{matrix} 1 & & 1 & \\ 1 & & -1 & \\ & 1 & & 1 \\ & 1 & & -1 \end{matrix} & & O & \\ & & \ddots & \\ & O & & \begin{matrix} 1 & & 1 \\ 1 & & -1 \end{matrix} \end{vmatrix}_{N \times N}$$

$$H_2^T = \begin{vmatrix} \begin{matrix} 1 & & 1 & \\ 1 & & -1 & \\ & 1 & & 1 \\ & 1 & & -1 \end{matrix} & & O & \\ & \begin{matrix} 1 & & 1 \\ 1 & & -1 \end{matrix} & & \\ & & 1 & \\ & & & \ddots \\ O & & & & 1 \end{vmatrix}_{N \times N}$$

$$H_M^T = \begin{vmatrix} \begin{matrix} 1 & 1 \\ 1 & -1 \end{matrix} & & & \\ & 1 & & O \\ & & \ddots & \\ O & & & 1 \end{vmatrix}_{N \times N}$$

where "O" indicates that the remaining elements of the matrix are "0".

and $$P = \begin{vmatrix} 2^{-M} & & & & & \\ & 2^{-M} & & & & \\ & & 2^{-M+1} \rlap{\text{ 2 times}} & & O & \\ & & & 2^{-M+1} & & \\ & & & & 2^{-M+2} \rlap{\text{ 4 times}} & \\ & & & & & 2^{-M+2} \\ & & & & & & \ddots \\ & O & & & & & & 2^{-1} \rlap{\,N/2 \text{ times}} \\ & & & & & & & 2^{-1} \end{vmatrix}$$

where "O" indicates that the remaining elements of the matrix are "0".

For illustrative purposes, the transform matrices are defined for dimension, N=16 as follows:

$$H = H_4 H_3 H_2 H_1$$

$$H^{-1} = H^T P = H_1^T H_2^T H_3^T H_4^T P$$

where $$H_1 = \begin{vmatrix} 1 & 1 & & & & & & & & & & & & & & \\ & & 1 & 1 & & & & & & & & & & & & \\ & & & & 1 & 1 & & & & & & & & & & \\ & & & & & & 1 & 1 & & & & & & & & \\ & & & & & & & & 1 & 1 & & & & & & \\ & & & & & & & & & & 1 & 1 & & & & \\ & & & & & & & & & & & & 1 & 1 & & \\ & & & & & & & & & & & & & & 1 & 1 \\ 1 & -1 & & & & & & & & & & & & & & \\ & & 1 & -1 & & & & & & & & & & & & \\ & & & & 1 & -1 & & & & & & & & & & \\ & & & & & & 1 & -1 & & & & & & & & \\ & & & & & & & & 1 & -1 & & & & & & \\ & & & & & & & & & & 1 & -1 & & & & \\ & & & & & & & & & & & & 1 & -1 & & \\ & & & & & & & & & & & & & & 1 & -1 \end{vmatrix}$$

$$H_2 = \begin{vmatrix} 1 & 1 & & & & & & & \\ & & 1 & 1 & & & & & \\ & & & & 1 & 1 & & & \\ & & & & & & 1 & 1 & \\ 1 & -1 & & & & & & & \\ & & 1 & -1 & & & & & \\ & & & & 1 & -1 & & & \\ & & & & & & 1 & -1 & \\ & & & & & & & & 1 \\ & & & & & & & & 1 \\ & & & & & & & & 1 \\ & & & & & & & & 1 \\ & & & & & & & & 1 \\ & & & & & & & & 1 \\ & & & & & & & & 1 \\ & & & & & & & & 1 \end{vmatrix}$$

$$H_3 = \begin{vmatrix} 1 & 1 & & & & \\ 0 & 0 & 1 & 1 & & \\ 1 & -1 & & & & \\ & & 1 & -1 & & \\ & & & & 1 & \\ & & & & 1 & \\ & & & & 1 & \\ & & & & 1 & \\ & & & & & 1 \\ & & & & & 1 \\ & & & & & 1 \\ & & & & & 1 \\ & & & & & 1 \\ & & & & & 1 \\ & & & & & 1 \\ & & & & & 1 \end{vmatrix}$$

$$H_4 = \begin{vmatrix} 1 & 1 & \\ 1 & -1 & \\ & & 1 \\ & & 1 \\ & & 1 \\ & & 1 \\ & & 1 \\ & & 1 \\ & & 1 \\ & & 1 \\ & & 1 \\ & & 1 \\ & & 1 \\ & & 1 \\ & & 1 \\ & & 1 \end{vmatrix}$$

The video processing system of the present invention is a small, portable, real time, all-digital transform processing system developed for video bandwidth compression applications as shown in FIG. 1. The video pre-conditioner 11 contains a video clamp, aliasing filter, sample/hold unit, and analog-to-digital converter. The video is sampled at 6.55 M samples/sec and digitized to 8 bits/sample (256 levels of gray). This is an input bit rate of 52.4 Mbps. The digitized video is separated into transform groups containing 16 consecutive samples or picture elements (pels) along horizontal video scan lines. There are 26 transform groups/scan line. The input video is 525 lines/frame, 30 frames/sec, 2:1 interlaced. The output of the pre-conditioner is a binary coded digital representation of a spatial picture which is converted into a transform domain representation of the picture by means of Fast Haar Transformer 12. The Haar transformer computes the fast rationalized Haar transform for each transform group (one-dimensional transforms), thus converting the spatial domain coefficients into Haar transform coefficients. The output of the Haar transformer is fed to filter unit 13. Filter unit 13 modifies the Haar transform coefficients as a function of the parameters of the input. This filtering operation greatly reduces the number of bits in the signal fed to modem 14 for transmission (usually over a radio frequency link), and thus effectively compresses the bandwidth of this signal.

A block diagram of the filter unit 13 is shown in FIG. 2. The compression filters and their functions are as follows:

a. Zonal filter 19: This filter sends those Haar transform coefficients selected by front panel switches to the compression unit. Those coefficients not selected for compression are sent directly to the channel modem.

b. Threshold filter 20: This filter sets to zero those transform coefficients less than a number between 1 and 16, as selected by front panel switches. These switches are thus used to select the amount of compression provided.

c. $2^{-N}$ multiplier 21: This filter multiplies transform coefficients by $2^{-N}$ for N=0, 1, 2 or 3, as selected by front panel switches.

d. Integer $\log_2$ compander 23: This filter assigns transform coefficients the integer values of their base 2 logarithms. (Ex: A coefficient whose value is 12 is replaced by the interger $\log_2 (12)=3$.)

e. Adaptive filter 24: This filter selects the N largest magnitude transform coefficients for N=1, 2, ... or 16, as selected by front panel switches. Those coefficients not selected by this filter are set to zero.

f. Edge enhancement filter 22: This filter multiplies transform coefficients selected by front panel switches by $2^N$, N=0, 1, 2 or 3.

For versatility, the compression filters are cascaded together and can be used in any combination.

The statistical processor 25 computes probability density functions of each transform coefficient or combination of coefficients on a frame basis. This statistical information is used for encoding the transform coefficient amplitudes and locations for various compression filter combinations and classes of imagery. The entropy of the picture before and after compression can also be measured.

The various compression filters as shown in FIG. 2 are easily mechanized by standard digital design techniques familiar to those trained in the art. For example, the threshold filter, which deletes coefficients below some specified (threshold) value, is easily mechanized with a digital comparator such as a cascade of SN7485 4-bit magnitude comparators, and the $\log_2$ compander is readily mechanized via a read-only-memory (ROM) or through the use of a SN74148 8 line-to-3-line priority encoder. (Texas Instruments TTL integrated circuit). The N-largest algorithm is likewise made up from a cascade of compositors and data registers in a manner familiar to those trained in the art. The $2^{-N}$ multiplier and the edge enhancement filter are easily mechanized with a N8243 8-bit position scaler. (Signetics TTL integrated circuit).

To better understand the block diagrams of FIGS. 1 and 2, the following example is given in conjunction with the waveforms shown in FIG. 3. This example assumes a transform dimension, N=16 (the matrices for which are illustrated earlier in the specification). Suppose the brightness levels scanned by a TV camera for some scene are as follows:

f(t)=71, 70, 127, 0, 12, 42, 34, 28, 97, 95, 94, 98, 110, 108, 109, 104. The results of the Haar transform as defined earlier are as follows:

H(t)=75, −29, 19, 6, 3, −2, 0, 0, 0, 64, −15, 3, 1, −2, 1, 0. Subjectively, good quality compressed picture results when the first 2 coefficients are passed to the encoder which feeds the signal to the modem 14 (see FIG. 7) without modification, the next two coefficients are companded and also sent to the encoder, and the remaining largest coefficient is companded and sent to the encoder along with its address. The encoder then has the following numerical stream to encode:

| | |
|---|---|
| 75 | coefficients 1 and 2 |
| −29 | |
| 4 | coefficients 3 and 4 companded |
| 2 | |
| 10 | coefficient 10 |
| 6 | companded amplitude of coefficient #10. |

It is the job of the encoder to convert this numerical stream into a bit stream suitable for transmission. The total number of bits required to represent the numerical stream is computed as follows:

| | | |
|---|---|---|
| Coeff. 1 | → 8 bits | |
| Coeff. 2 | → 8 bits | |
| Coeff. 3 | → 4 bits | (3 Amplitude + 1 sign) |
| Coeff. 4 | → 4 bits | |
| Coeff. 10 | → 8 bits | (4 Bits address + 3 bits Amplitude + 1 bit sign) |
| Total | = 32 bits | |

A total of 32 bits of compressed data are required to represent the original (16×8=) 128 bits of uncompressed input data. A 4:1 bit rate compression has thus been realized.

At the receiver, the bit stream is recovered and inverse filtered into the following sequence: Ĥ(t)=75, −29, 16, 8, 0, 0, 0, 0, 0, 64, 0, 0, 0, 0, 0, 0. Note that coefficients 1 and 2 are exactly as they were originally computed, but coefficients 3, 4 and 10 differ slightly from their original value, this difference is due to the companding rule used; all the remaining coefficients are set to zero, since we had not transmitted any information concerning their values. At this point the inverse Haar transform is computed to yield the recovered brightness levels and f̂(t)=62, 62, 126, −2, 30, 30, 30, 30, 112, 112, 112, 112, 96, 96, 96, 96. The total mean square error is only 1.1% for this difficult to compress waveform.

DESCRIPTION OF THE PREFERRED EMBODIMENT

Figure 4:
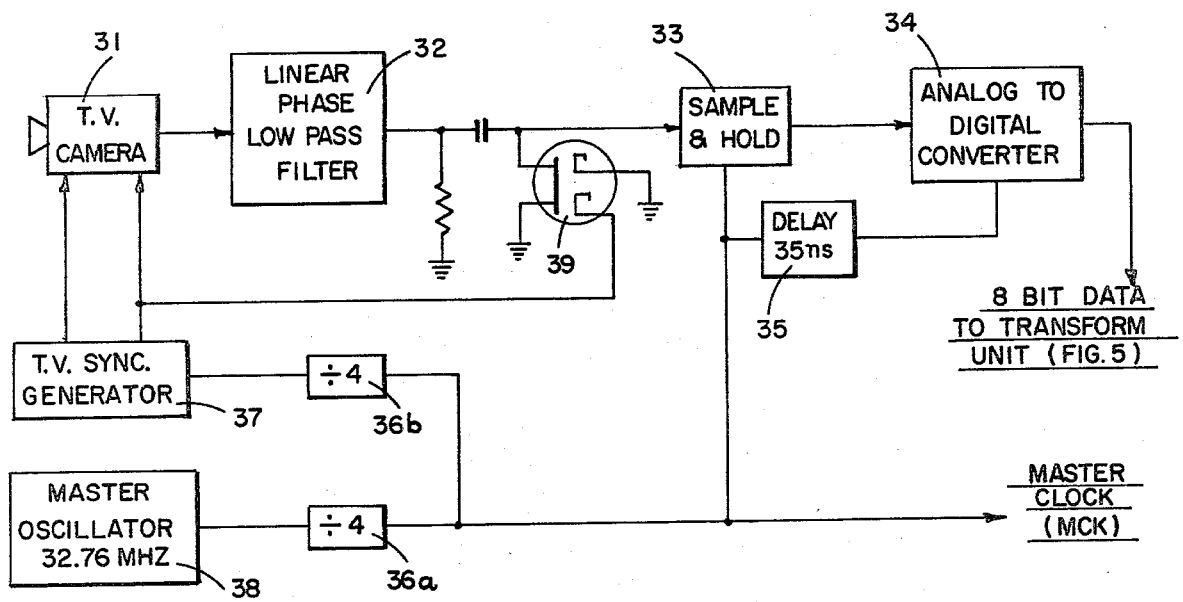
FIG. 4 is a block diagram of a preferred embodiment of the video pre-conditioner.

Referring now to FIG. 4, detailed block diagram of a preferred embodiment of the video pre-conditioner 11 is shown. Non-composite video from the TV camera 31 is passed through a 4 MHz linear phase low pass filter 32 which prevents aliasing of the data when it is later digitized (8.19 MHz clock). The low pass filtered data is clamped to ground by means of a video clamp 39, which is driven by the horizontal TV camera sync signal from TV sync generator 37. The clamping operation provides a fixed DC reference for the subsequent digitizing operation. Clamped analog data is sampled by the sample and hold unit 33 to enable the analog-to-digital converter 34 to function in its conversion of the analog signals into digital signals. The sampling process and the analog-digital conversion process is initiated by the master clock (MCK) signal generated by master oscillator 38 and divided by divider 36a. A 35 ns delay is provided between the sample and hold signal and the analog-digital converter signal by means of delay circuit 35 to allow for the fixed propagation delay characteristics of the sample and hold unit. The master clock signal is digitally derived from master oscillator 38 operating at 32.76 MHz by means of binary divider 36a. The output of divider 36a is further digitally divided by means of divider 36b to provide the 2.0475 MHz clock signal required to drive the TV sync generator 37. Digitized data from the analog-digital converter 34 and the master clock signal (MCK) are fed to the fast Haar transformer 12 described later in the specification in connection with FIG. 5. Sample and hold unit 33 and analog-digital converter 34 may be commercially available units such as Datel models SHM-UH and UH8B respectively, manufactured by Datel Systems Inc., Canton, Mass.

Figure 5:
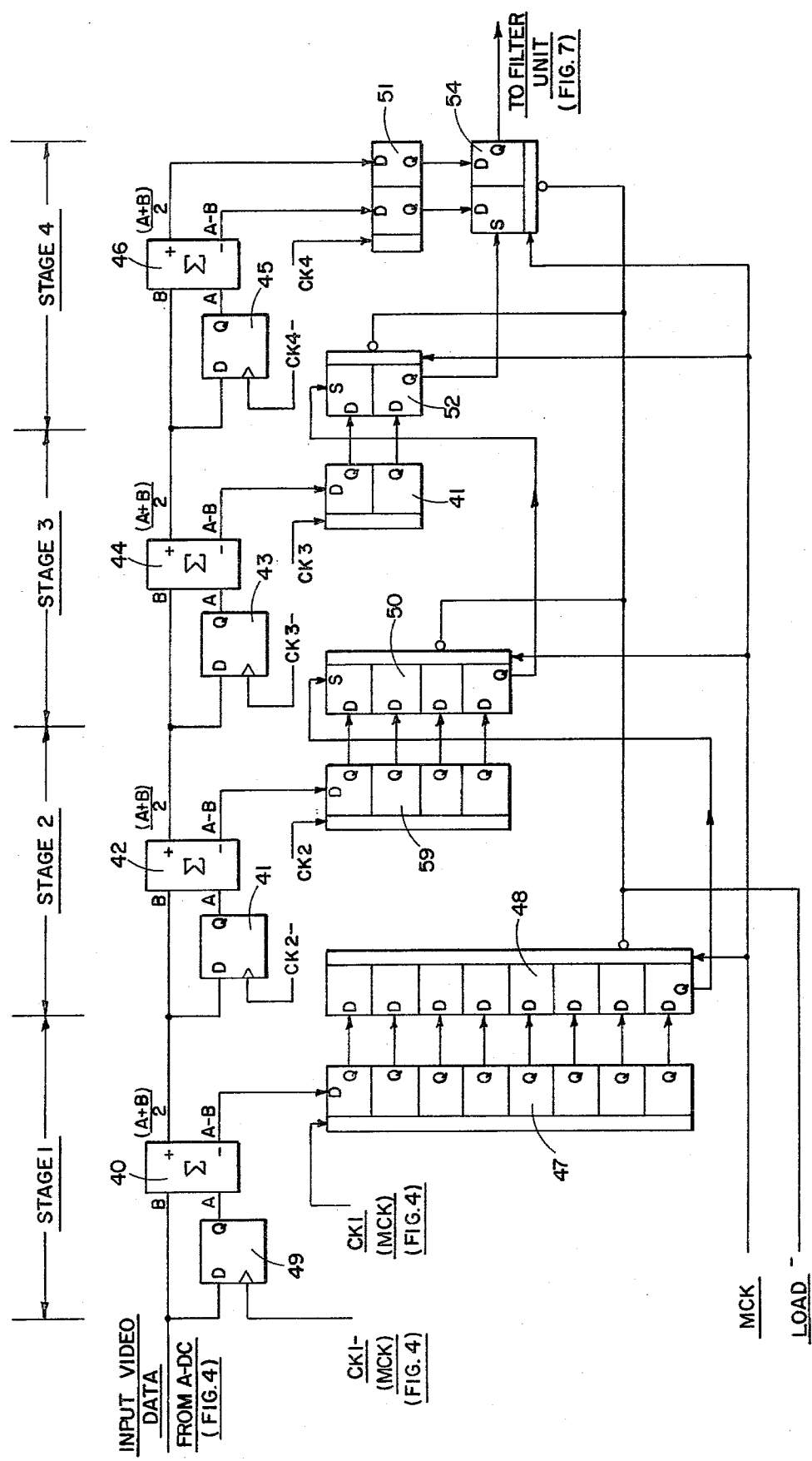
FIG. 5 is a schematic drawing of a preferred embodiment of the fast Haar transformer.
Figure 6:
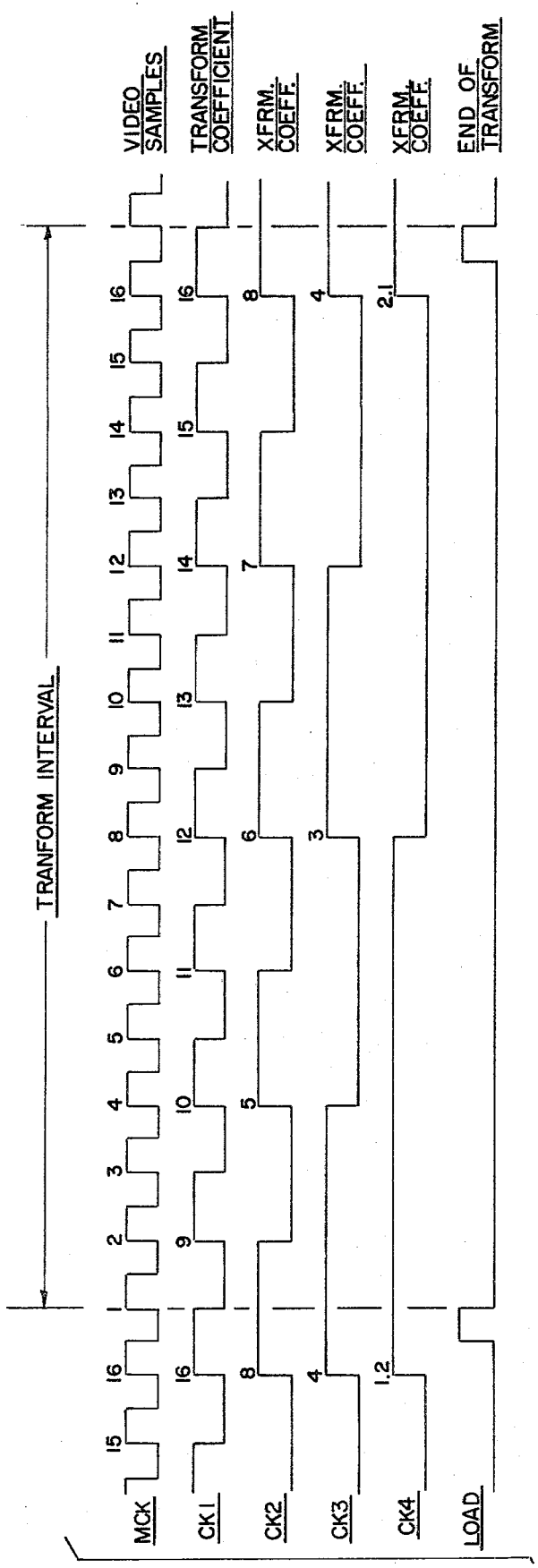
FIG. 6 is a timing diagram for the transformer of FIG. 5.
Figure 6:
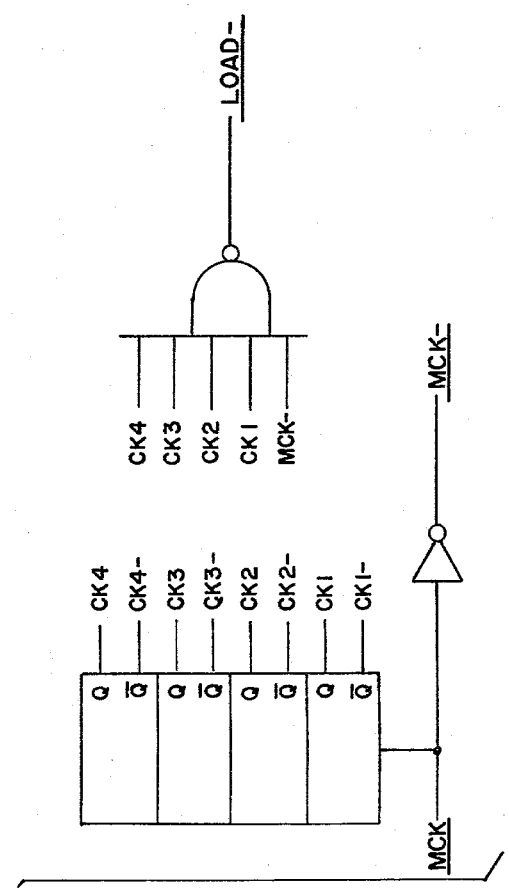

Referring now to FIGS. 5 and 6, a preferred embodiment of the Fast Haar transformer 12 and a timing diagram for this unit are respectively shown. Stage 1 of the transformer implements the matrix equation $H_1$, where N=16. Stages 2-4 implement corresponding matrix equations $H_2$-$H_4$ respectively (set forth earlier in the specification). The circuitry of FIG. 5 utilizes a pipeline architecture which allows the four matrix equations to be solved simultaneously and in real time.

Input video data from analog-digital converter 34 (FIG. 4) is fed to data latch 49 and adder-subtractor 40. The first video sample is stored in data latch flipflop 49 in response to the leading edge of clock CK1 (see FIG. 6). The output of latch 49 is fed to the "A" input of adder/subtractor 40. The second video data sample is then applied to the "B" input of the Stage 1 Adder/Subtractor 40, whereupon the sum and difference terms are computed and appear at the indicated outputs of the adder/subtracter. The difference term is a transform coefficient and is stored into storage register 47 in response to the leading edge of a succeeding one of clock pulses CK1. Storage registers 47, 48, 59, 50, 41, 52, 51 and 54 are interconnected to form a shift register, so that data as it appears at the input causes previously entered data to shift towards the output upon application of the register clock. The data moves one position for each clock pulse.

The stage 1 sum term output of adder/subtractor 40 is divided by two by virtue of a hardwired binary shift of one place to the right, this to prevent arithmetic overflow and to incorporate the diagonal P-matrix which is necessary for proper inverse transformation.

The third and fourth samples are processed by stage 1 in the same manner as samples 1 and 2. The sum term of adder/subtractor 40, however, is applied to the "B" input of the Stage 2 adder/subtractor 42, and to data latch 41, this sum term being stored in the data latch in response to the leading edge of CK2. The sum and difference of the inputs to adder/subtractor 42 are computed as described in connection with Stage 1. In an analogous fashion to the processing of Stage 1, the Stage 2 difference is stored into storage register 59 in response to the leading edge of CK2. The Stage 2 sum term is stored in the Stage 3 data latch 43 in response to the leading edge of CK3.

The remainder of the 16 video samples are processed in analogous fashion until storage registers 47, 59, 41 and 51 are filled with the output terms generated in Stages 1 through 4. The load pulse is now generated and the contents of registers 47, 59, 41 and 51 are parallel loaded into registers 48, 50, 52 and 54 respectively. This loading operation reorders the coefficients as required by the inverse transform unit and buffers the data rate into the filter unit. Data registers 48, 50, 52 and 54 are connected in series so that the filter unit receives a different transform coefficient upon each application of the leading edges of clock pulses MCK.

Figure 7:
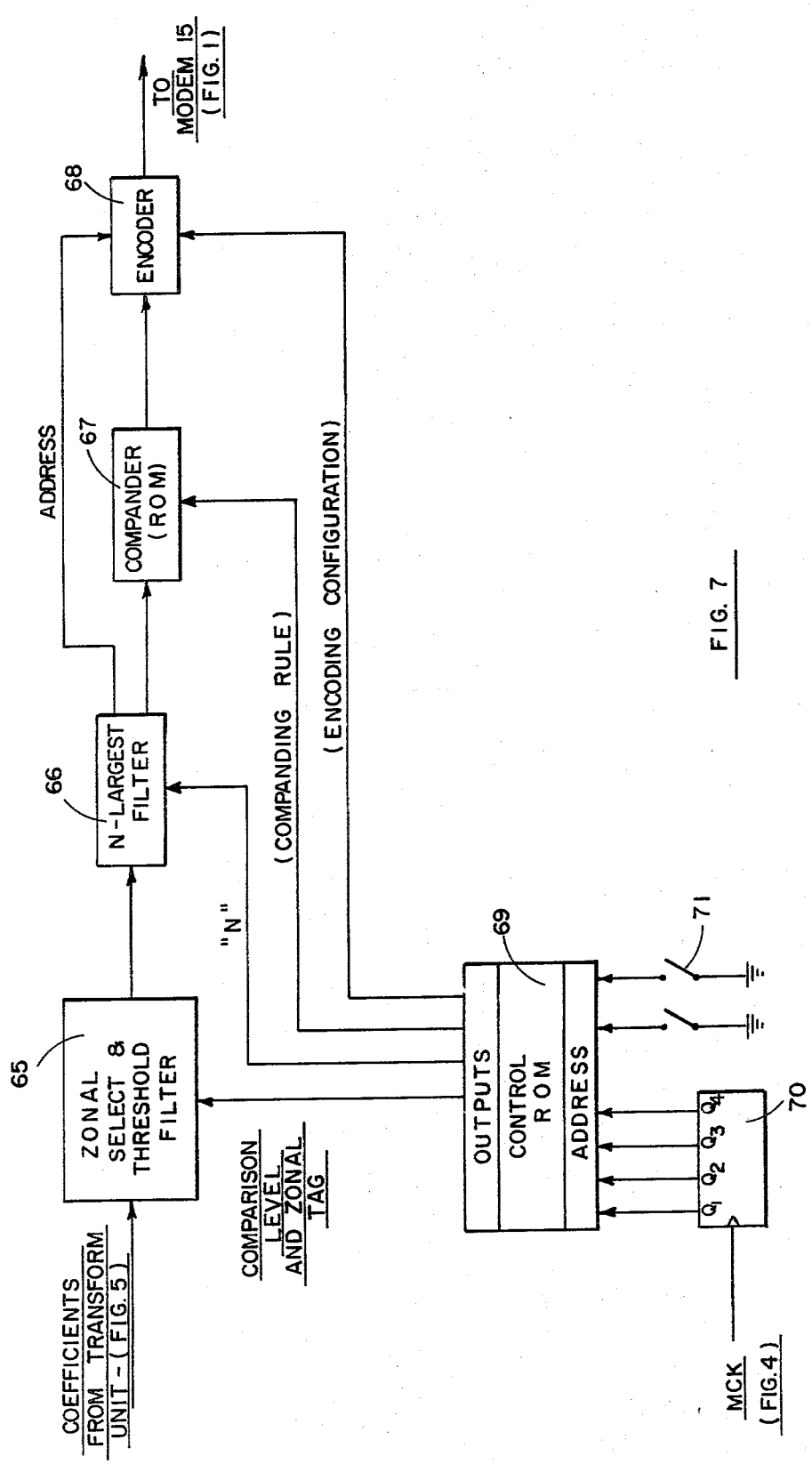
FIG. 7 is a block diagram of a preferred embodiment of the filter unit.

Referring now to FIG. 7, a second embodiment of the filter unit 13 is shown. The filter unit takes the transform coefficients generated by the Fast Haar Transform and performs various filtering operations upon them. Incoming transform coefficients pass through the zonal select and threshold filter 65, whereupon they are selectively set to zero. The selection process is governed by the control ROM 69, which provides a comparison level (which may vary from one transform coefficient to the next) to the threshold filter. Any transform coefficient greater in magnitude than the threshold value is sent on to the N-largest filter without modification, and any transform coefficients less than or equal in magnitude to the threshold value are set to zero. The zonal select option allows certain coefficients to be tagged so that they will be ignored by the N-largest filter. Usually, coefficients 1 and 2 are tagged as zonal coefficients since they represent the majority of the visual picture energy and they are absolutely necessary for proper picture reconstruction.

The N-largest filter 66 is an adaptive filter which automatically selects the "N" largest transform coefficients from the coefficients not tagged as zonal terms and sends them on to the compander 67 for further processing. The N-largest filter also sends the address of the selected coefficients to the encoder 68. Any remaining non-zonal coefficient is set to zero. "N" is specified in accordance with the amount of compression desired and is usually equal to one or two. This filter typically utilizes a cascade of digital comparators and holding registers which operate to select and store the largest coefficients of interest. The compander 67 may comprise an ROM providing a non-linear mapping operation of input values into output values. The companding rule is usually logarithmetic which allows 127 input values to be spanned by 8 out values according to the following:

$$f_{out} = \text{Integer } \log_B[(\text{fin})] \tag{1}$$

where $F_{out}$ = integer part of the logarithm to the base B of fin. The base, B, is usually between 1.2 and 2.0. If the base is 2.0, then the compander can be mechanized by a priority encoder. The companding rule may differ from coefficient to coefficient, as specified by the control ROM 69.

The encoder 68 concatinates the companded zonal terms to the companded N-largest terms to the N-largest address, and forms a serial bit stream suitable for transmission by a digital modem.

The control ROM 69 is programmed to provide the parameters necessary to the proper functioning of the filter unit. Addressing of the control ROM is accomplished in response to 4 bit binary counter 70 and the bandwidth compression selector switches 71. The binary counter is clocked by MCK which is synchronized with the incoming transform coefficients. There are as many states to counter 70 as there are transform coefficients. The selector switches 71 are manually operated to determine the type of filtering desired.

Figure 1:
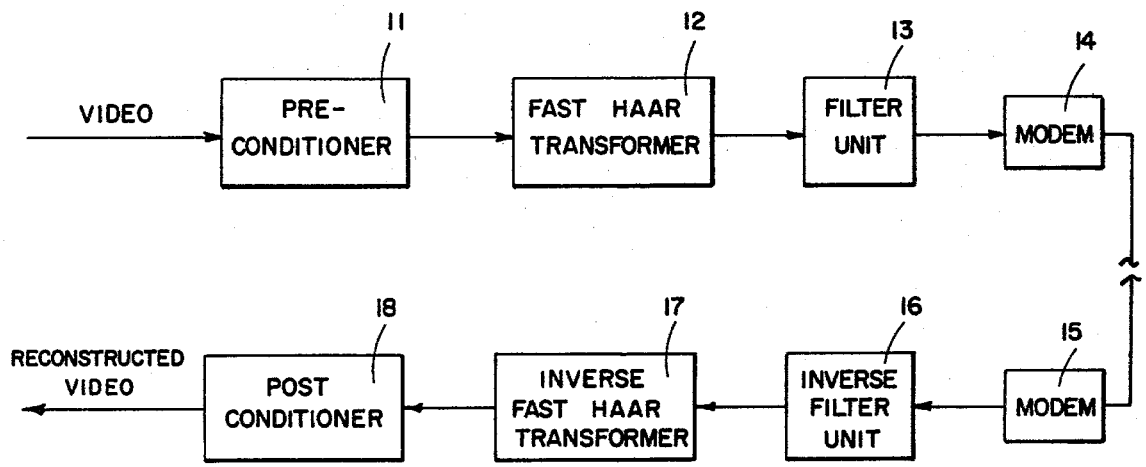
FIG. 1 is a block diagram of the invention.
Figure 2:
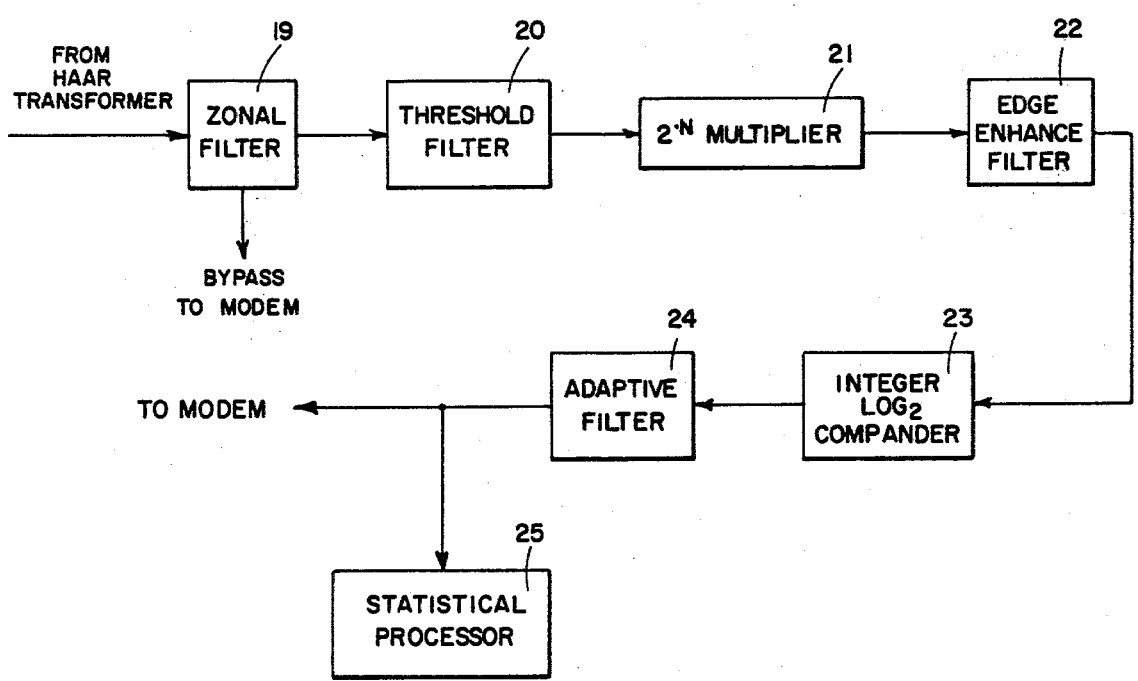
FIG. 2 is a block diagram of the filter unit of the invention.
Figure 3:
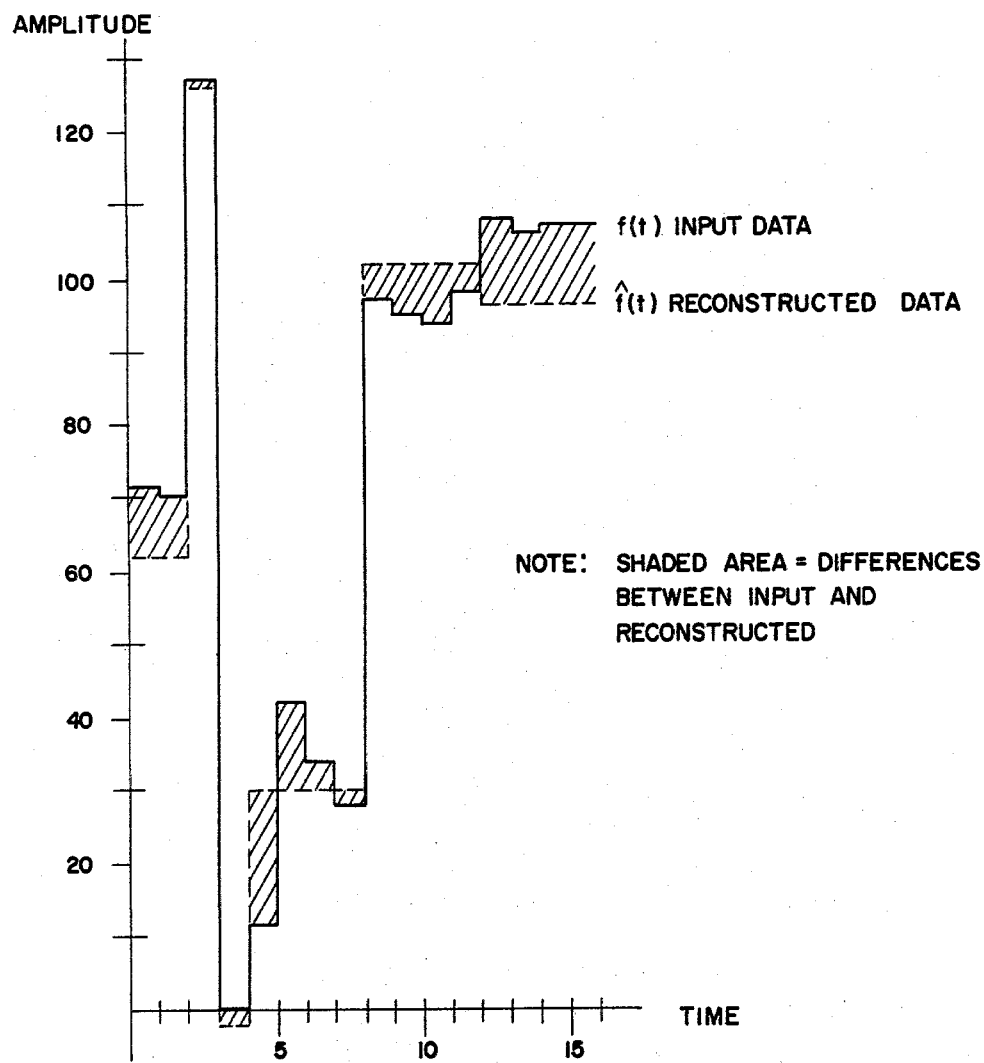
FIG. 3 is an exemplary waveform illustrating the compression process of the invention.

The output of encoder 68 is fed to the transmit modem 14 (FIG. 1) which operates to convert the digital signal to an RF signal suitable for transmission. The RF signal is received by a receive modem 15 (FIG. 1) which converts this signal to a digital signal for processing by inverse filter unit 16, now to be described.

Figure 8:
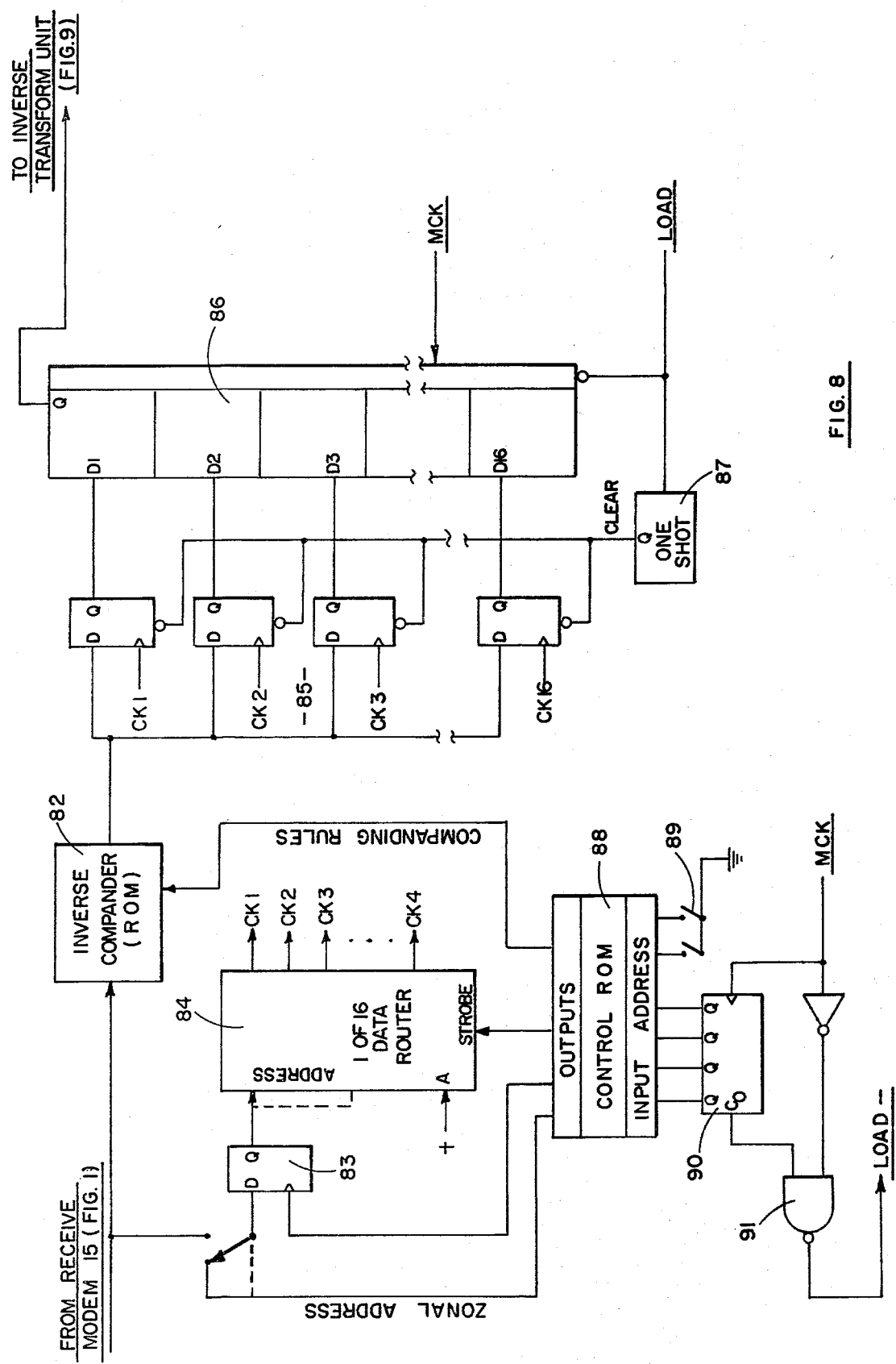
FIG. 8 is a schematic drawing of a preferred embodiment of the inverse filter unit.

Referring now to FIG. 8, a preferred embodiment of the inverse filter unit 16 is shown. This unit provides the means for decoding the serial bit stream from the receive modem into a series of digital words which are the transform coefficients to be inversely transformed.

The bandwidth compression switches 89 are set to correspond with similar switches 71 in the filter unit. Since the transmission format is known apriori, the control ROM 88 can generate the timing signals necessary to distinguish zonal coefficients from N-largest coefficients and addresses. Zonal coefficients are inversely companded by the inverse compander ROM 82 and stored into the appropriate holding register 85, upon the arrival of the appropriate clock CK1, CK2, etc. The clocking for the holding register 85 is provided by the data router 84 which applies a positive going pulse to the clock line selected by the input address lines of the data route 84 when the control ROM 88 provides a strobe signal thereto.

Adaptive N-largest coefficients have both amplitude and address parameters to be considered. The control ROM 88 is programmed to switch the input to the address register 83 to the receive modem data line at the proper time. The control ROM 88 generates a clock signal to address register 83 to store the N-largest address into the address register. The N-largest amplitude is then inversely companded by means of inverse compander 82 and stored into the holding register 85 specified by the address register 83, in a manner similar to the zonal coefficients.

When the control ROM address counter 90 indicates a full count (CO=TRUE), a "load" pulse is generated through gate 91 which transfers the newly received transform coefficients from the holding registers 85 to the output registers 86. After the loading is completed, the holding registers 85 are cleared to zero by application of a clear pulse generated by 1-shot multivibrator 87.

The output registers 86 are similar to the shift registers used in the transform unit. e.g. 48, and data is shifted one coefficient at a time from the output registers 86 to the inverse transform unit in response to each master clock pulse (MCK).

Figures 9, 9A, 9B:
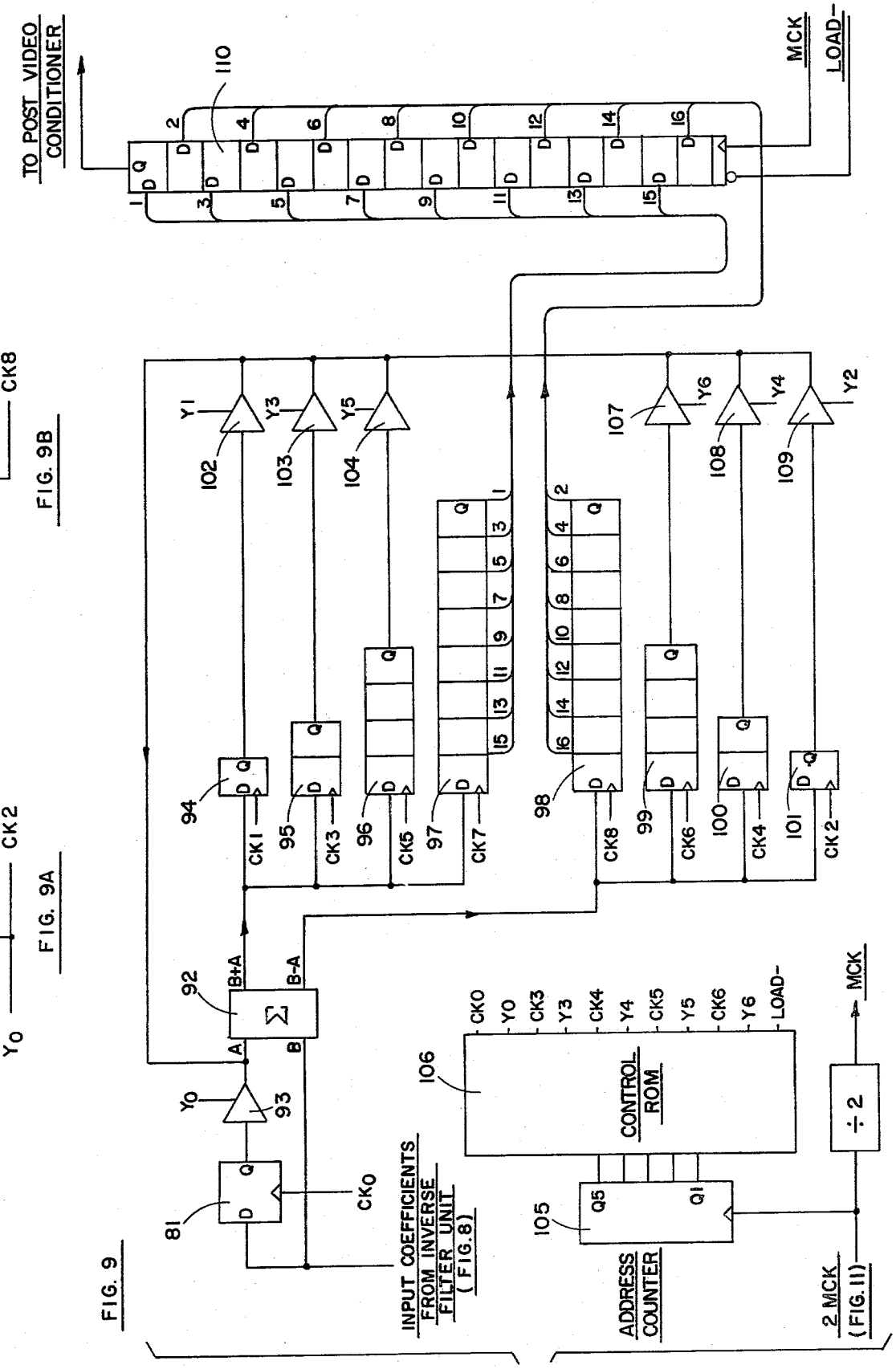
FIG. 9 is a schematic drawing of a preferred embodiment of the inverse fast Haar transformer.
FIG. 9A illustrates connections for the gate signal (Yo) in FIG. 9.
FIG. 9B illustrates connections for the master clock signal (MCK) in FIG. 9.
Figure 10:
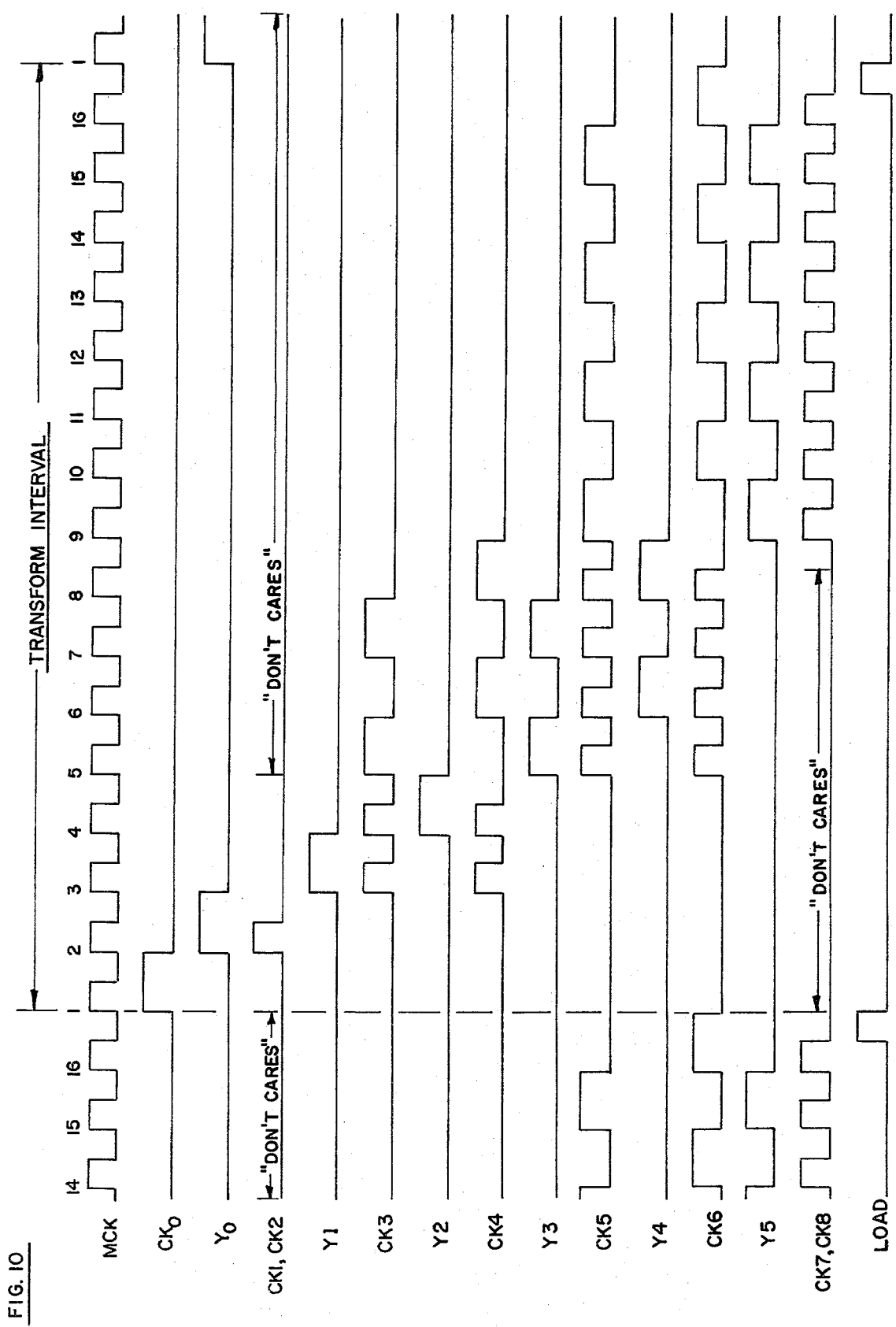
FIG. 10 is a timing diagram for the inverse transformer of FIG. 9.

Referring now to FIGS. 9 and 10, a preferred embodiment of the inverse fast Haar transformer unit 17 and a timing diagram for this unit are respectively shown. The inverse fast Haar transformer unit is the counterpart to the fast Haar transformer unit. The inverse transformer unit converts transform domain information into spatial (picture) domain information. The inverse transformer unit is controlled by clocking the control ROM 106 which generates the indicated clocks and gating signals shown in FIG. 10. The control ROM is caused to clock in synchronism with the master clock (MCK) by application of clock signal "2MCK" to the ROM address counter 105. Clock 2MCK is generated as to be described in connection with FIG. 11.

Transform coefficients from the inverse filter unit are fed to storage register 81 and adder/subtractor module 92. Clock $CK_o$ causes the first transform coefficient to be stored in register 81. Tristate gate 93 is gated in response to gate signal Y0. The second transform coefficient is applied to the "B" input of adder/subtractor module 92 whereupon the sum and difference terms are computed. The sum term is stored in register 94 and the difference term is stored in register 101 by application of CK1 and CK2 respectively.

Tristate gate 93 is turned off by removal of gate signal Y0 and tristate gate 102 is turned on by application of gate signal Y1, which causes the contents of register 94 to be applied to the A input of adder/subtractor module 92. The third transform coefficient is simultaneously applied to the "B" input of adder/subtractor module 92 whereupon the sum and difference terms are generated and stored into holding registers 95 and 100 respectively. Tristate gate 102 is turned off by removal of gate signal Y1 and tristate gate 109 is turned on by application of gate signal Y2, which causes the contents of data register 101 to be applied to the "A" input of adder/subtractor module 92. The fourth transform coefficient is simultaneously applied to the "B" input of adder/subtractor module 92 whereupon the sum and difference terms are generated and stored into holding registers 96 and 99 respectively. The holding registers are organized like shift registers so new data entering each register causes old data to be shifted one place towards the output in response to each succeeding clock signal.

Transform coefficients 5 through 16 are processed in an analagous fashion as transform coefficients 1 through 4, which leaves holding registers 97 and 98 filled with sum and difference terms respectively. At this point a "load" pulse is generated which causes the contents of holding registers 97 and 98 to be parallel loaded into output register 110 in the interlaced fashion as shown. The output register 100 now contains the spatial domain equivalent of transform coefficients 1 through 16, which are clocked to the post video conditioner 18.

Figure 11:
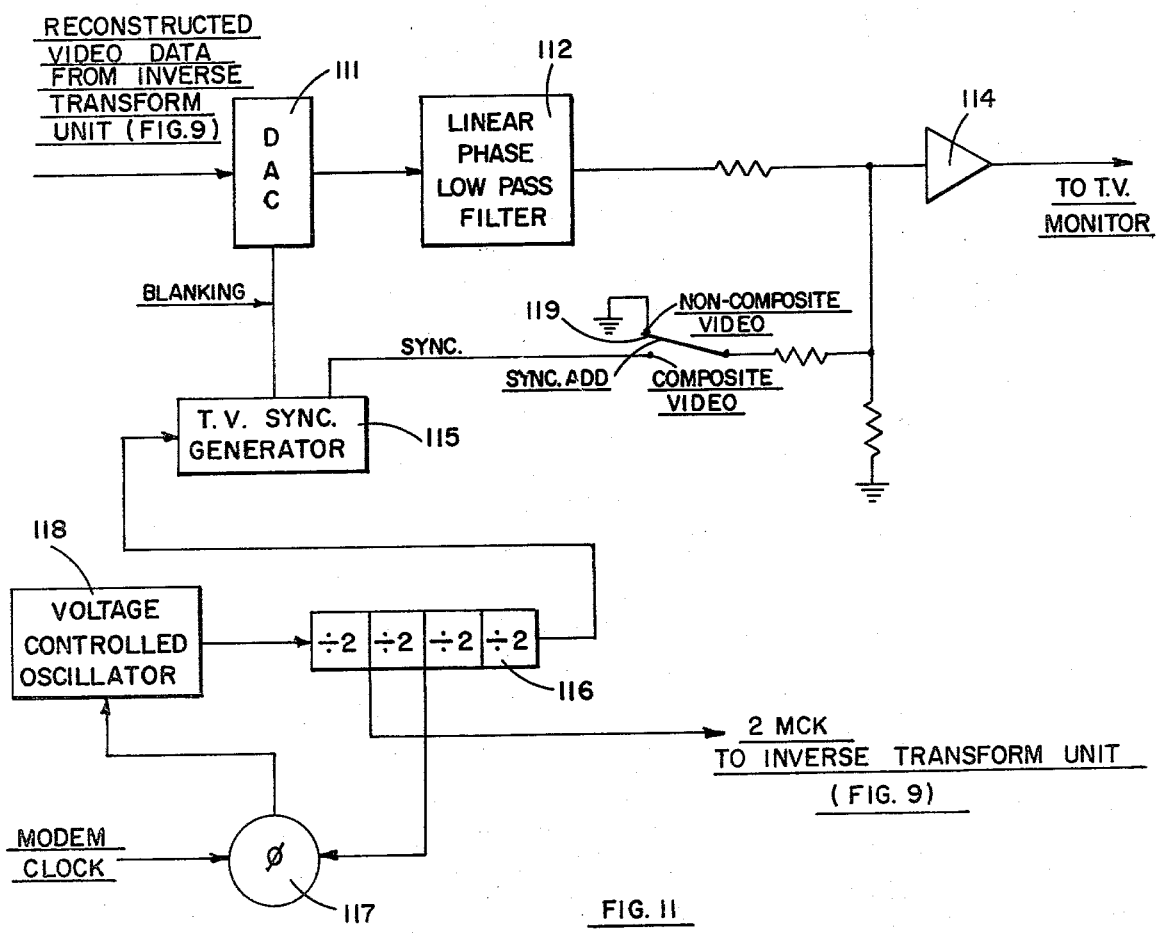
FIG. 11 is a schematic drawing of a preferred embodiment of the post video conditioner.

Referring now to FIG. 11, a preferred embodiment of the post video conditioner 18 is shown. The digitally reconstructed spatial data from the inverse transformer 17 is fed to digital-to-analog converter 111 for conversion from digital data to analog data, which is low pass filtered by the linear phase low pass filter 112 before being sent to the output amplifier 114, the output of which is suitable for viewing on a standard TV monitor. Voltage controlled oscillator (VCO) 118 is phase locked to the modem clock (not shown) by means of the phase lock loop formed by VCO 118, divider 116 and phase comparator 117. The TV sync generator 115 is driven with a 20,475 MHz clock signal, which provides blanking information to the DAC and a sync-add option via switch 119. Clock signal 2MCK is generated by binary division of the 13.76 MHz VCO clock signal.

Figure 12:
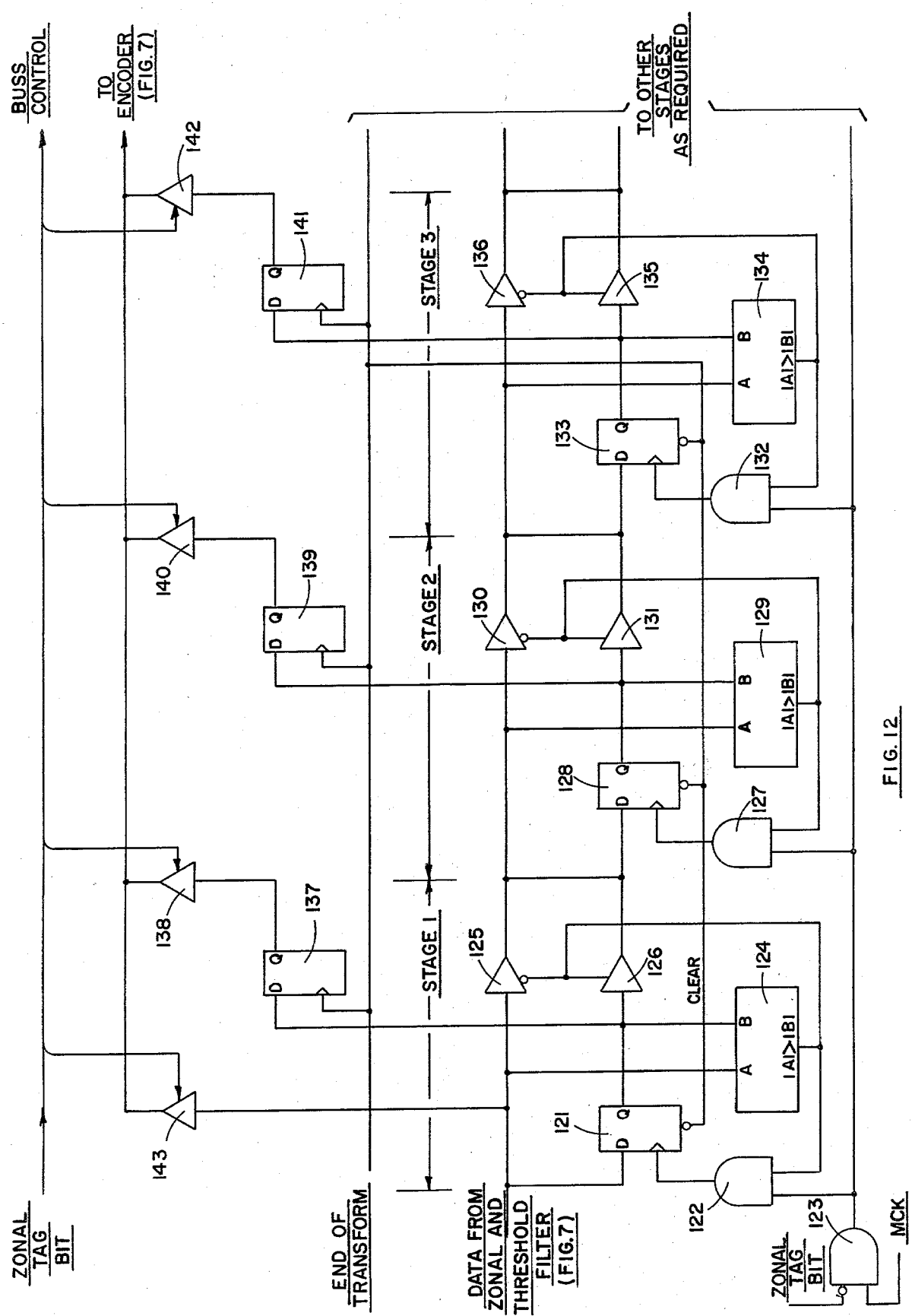
FIG. 12 is a schematic drawing of a preferred embodiment of the N-largest filter of the filter unit.

A simplified functional diagram of a preferred embodiment of the N-largest filter is shown in FIG. 12. Data from the zonal select and threshold filter 65 is applied to the input of tristate buss drivers 143 and 125 and to storage register 121 and comparator 124. If the zonal tag bit is "true" (indicating that this bit represents a zonal coefficient not to be compressed), a signal from the encoder (FIG. 7) enables gate 143 which allows that coefficient to by-pass the N-largest filter. If the zonal tag bit is "not true", the coefficient is processed as follows: Assume that an "END of Transform" signal has just appeared which clears to zero holding registers 121, 128, 133, ..., for as many stages as are mechanized. The value of the magnitude of the first coefficient is compared in comparator 124 against that of the contents of holding register 121. If the input coefficient is greater in magnitude than the coefficient in the holding register, i.e., $|A|>|B|$, comparator 124 designates the condition by generating a "TRUE" signal at its output, which in turn enables gate 126 and disables gate 125. The enabling of gate 126 allows the contents of register 121 to be applied to the input of register 128, gate 130 and comparator 129. Since the data in registers 121 and 128 is still zero, comparator 129 does not generate an $|A|>|B|$ signal, which means that gate 130 is enabled. Signals are provided to the remaining stages in the same manner as for stage 2. Upon application of the master clock, MCK, gates 122, 127, 132 . . . , pass their respective comparison signals to holding registers 121, 128, 133 . . . , respectively. Whenever the $|A|>|B|$ signal is present, the holding register clocked by the $|A|>|B|$ signal stores whatever data appears at its D input. In the present case where the first coefficient is being examined, only register 121 is clocked since only comparator 124 has generated $|A|>|B|$. The next coefficient is now applied to holding register 121, comparator 124, etc. If this coefficient is greater in magnitude than the coefficient stored in register 121, then following the procedure just described for the first coefficient, the second (larger) coefficient is clocked into register 121 and the coefficient which was in register 121 is clocked into second stage register 128 (it is to be noted that the process of clocking data into register 121 enables gate 126 which connects the output of register 121 to the input of register 128).

The third coefficient is processed like the second coefficient and, depending upon its magnitude, it may end up in register 121, 128, 133, . . .

All successive coefficients are processed in a similar manner. At each stage the coefficient is compared against the data value already stored by that stage. If the coefficient is larger than the current value being stored by that stage, that stage updates its stored data value to the new (larger) value and sends its old value to the next successive stage for storage. If the coefficient is not larger than the one currently being stored, it is sent to the next stage for comparison.

All stages operate in an identical manner and there are as many stages as there are N-largest coefficients being selected. Usually, two or three stages are adequate.

After all the coefficients have been compared and the largest ones retained in registers 121, 128, 133 . . . , the "end of transform" signal is generated which transfers the data from registers 121, 128, 133 . . . , to registers 137, 139, 141 . . . , respectively. The outputs of 137, 139, 141 . . . , are connected to a tristate buss via gates 138, 140, 142 . . . , for transfer to the encoder.

For clarity, storage of the address of the coefficients selected by the N-largest filter has not been explicitly shown. However, registers 121, 128, 133 . . . , are assumed to be sufficiently large so that the coefficient address (number) is stored at the same time the coefficient value is stored. The coefficient address is a number between 1 and 16 (for 16 point transforms) and is numerically equal to its generation order, i.e., coefficient 1 has address 1, coefficient 2 has address 2, etc. Although not specifically shown, comparators 124, 129, 134 . . . , operate only on coefficient magnitude, not coefficient address.

We claim:

1. A filter system for encoding transform coefficients representing video data to substantially reduce the number of bits therein comprising:

zonal filter means for receiving said transform coefficients and separating preselected coefficients for compression from coefficients not to be compressed, threshold filter means coupled to the output of said zonal filter means for receiving the preselected coefficients for compression and deleting transform coefficients below a predetermined magnitude therefrom, multiplier means coupled to the output of said threshold filter for eliminating a preselected number of least significant digits from said transform coefficients, edge enhancer filter means coupled to the output of said multiplier means for multiplying various preselected higher order transform coefficients to provide edge enhancement thereof, compander means coupled to the output of said edge enhancement filter means for providing further compression of said transform coefficients by various non-linear companding based on an integer log functional rule, and adaptive filter means coupled to the output of said compander for selecting the N largest magnitude coefficients to thereby provide filter digitized transformed video data.

2. The system as described in claim 1 and further including statistical processor means coupled to the output of said adaptive filter means for providing probability density information of the filtered digitized transformed data.

3. The system as described in claim 1 and wherein said threshold filter means includes a plurality of digital comparators.

4. The system as described in claim 1 and wherein said multiplier means includes means for multiplying the output of said threshold filter by $2^{-N}$.

5. The system as described in claim 4 and wherein said means for multiplying the output of said threshold filter by $2^{-N}$ includes a hard wired binary shift register.

6. The system as described in claim 1 and wherein said edge enhancement filter means includes a position scaler.

7. The system as described in claim 1 and wherein said compander means includes an integer $\log_2$ compander.

8. The system as described in claim 7 and wherein said integer $\log_2$ compander includes a read-only-memory.

9. The system as described in claim 7 and wherein said integer $\log_2$ compander includes a priority encoder.

10. The system as described in claim 1 and wherein said adaptive filter means includes a plurality of comparators and data registers.

11. A real time video bandwidth compression system comprising:

means for providing a digital data signal representing video data,

Haar transformer means for converting said digital data signal to a transform domain signal represented by Haar transform coefficients, filter means coupled to the output of said transformer for selectively encoding the transform coefficients to provide a transform domain signal having a substantially decreased number of bits, thereby compressing the transform domain signal, said filter means including threshhold filter means for deleting coefficients below a predetermined numerical value, and transmitting modem means coupled to the output of said filter means for modulating a carrier signal with the compressed transform domain signal and transmitting said modulated carrier signal.

* * * * *